United States Patent Office 3,733,287
Patented May 15, 1973

3,733,287
PAINT COMPOSITIONS CAPABLE OF BEING CURED BY IRRADIATION OF ELECTRON RAY
Hiromasa Masuda, Osaka, Yukio Nomura, Nishinomiya, and Toru Fuyuki and Junichi Matsuzaka, Yokohama, Japan, assignors to Nippon Oils and Fats Company Limited, Tokyo, Japan
No Drawing. Filed June 30, 1971, Ser. No. 158,612
Claims priority, application Japan, June 29, 1970, 45/56,786
Int. Cl. C09d 3/26, 5/32
U.S. Cl. 260—21                    5 Claims

ABSTRACT OF THE DISCLOSURE

A paint composition capable of being cured by irradiation of electron ray in a low absorbed dose comprises a component (I) obtained by reacting triepoxypropyl isocyanurate with a sufficient amount of acrylic acid or methacrylic acid to esterify two or more epoxy groups in said isocyanurate or a resinous component (II) obtained by reacting (A) a reaction product of 1 mole of urea, melamine, benzoguanamine or acetoguanamine with at least 2 moles of formaldehyde, or (B) hexamethoxymethylmelamine with 2 to 6 moles of an $\alpha,\beta$-unsaturated ester having the general formula

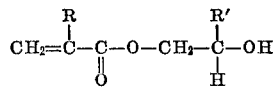

wherein R and R' are hydrogen or methyl group alone or in admixture with a saturated alcohol, and a resinous component (III) obtained by reacting a reaction product of 1 mole of a natural drying oil or semi-drying oil with 2 to 5 moles of maleic anhydride with 2 to 5 moles of the above described $\alpha,\beta$-unsaturated ester based on 1 mole of the drying oil or semi-drying oil.

---

The present invention relates to paint compositions, which can be cured by irradiation of electron ray and have an excellent gloss, a smooth surface of coated film and high weather resistance, abrasion resistance, stain resistance, moisture resistance and chemical resistance.

The previous process for improving mechanical and thermal properties of coated films comprises causing cross-linked bond in a mixture of two or more polyfunctional polymers having two or more functional groups in one molecule or different polyfunctional polymers by means of a heat energy.

Recently, the cross-linking polymerization using physical energy, such as radiation and ultraviolet ray has been proposed. Accordingly, polyfunctional polymers which are suitable for paint binder in view of paintability, thin film-forming ability and pigment wettability and can be subjected to a cross-linking polymerization by using radiation or ultraviolet ray, have been demanded.

As only one paint resin which can be subjected to the cross-linking polymerization by irradiating electron ray and be cured, an unsaturated polyester resin has been heretofore known.

However, the coated film of the unsaturated polyester resin cured by electron ray is high in hardness but is brittle in mechanical property, poor in abrasion resistance and weather resistance and cause cracks owing to a long period of exposure to aid and decreases gloss and therefore the use field has been limited.

Since the curing is the cross-linking polymerization reaction, even if the coated film is sufficiently irradiated, the surface is not solidified due to contact with air and the stickiness remains. In order to avoid this demerit, a means in which a small amount of saturated aliphatic hydrocarbon having a melting point of higher than room temperature is usually dispersed in said paint, and air is isolated by a thin film of the saturated aliphatic hydrocarbon formed on the coated film has been adopted. However, in such a means, in the case of unsaturated polyester, the surface of coated film becomes hazy and in order to obtain a glossy surface, it is necessary to effect a proper polishing. This has been a considerable hindrance, which prevents a high speed coating in the high speed line, in which the paint is dried by irradiation of electron ray.

The inventors have made various studies and found the paint compositions capable of being cured by irradiation of electron ray, which have not the above described demerits.

The present invention consists in paint compositions capable of being cured by irradiation of electron ray in a low absorbed dose, which comprises a component (I) obtained by reacting triepoxypropyl isocyanurate with a sufficient amount of acrylic acid or methacrylic acid to esterify two or more epoxy groups in said isocyanurate or a resinous component (II) obtained by reacting (A) a reaction product of 1 mole of urea, melamine, benzoguanamine or acetoguanamine with at least 2 moles of formaldehyde, or (B) hexamethoxymethylamine with 2 to 6 moles of an $\alpha,\beta$-unsaturated ester having the general formula

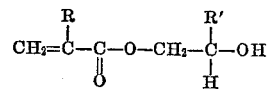

wherein R and R' are hydrogen or methyl group alone or in admixture with a saturated alcohol, and a resinous component (III) obtained by reacting a reaction product of 1 mole of a natural drying oil or semi-drying oil with 2 to 5 moles of maleic anhydride with 2 to 5 moles of the above described $\alpha,\beta$-unsaturated ester, based on 1 mole of the drying oil or semi-drying oil.

The present invention relates to the paint compositions which can be cured by irradiation of electron ray in a small absorbed dose of 2 to 6 megarads in air and the cured coated film is composed of a mixture of the above described component (I) or (II) and the above described resinous component (III) and the variation of the mixing ratio of the mixture can provide from a flexible coated film to a rigid and tough coated film.

The component (I) of the paint composition of the present invention is prepared from triepoxypropyl isocyanurate having the following structure

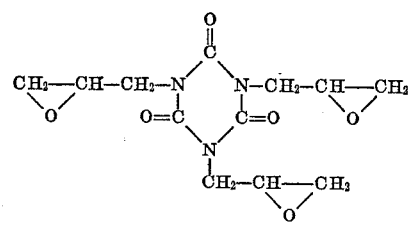

and acrylic acid or methacrylic acid.

The acrylic acid or methacrylic acid is used in such an amount that at least 2 epoxy groups in triepoxypropyl isocyanurate can be esterified but in general 3 moles of acrylic acid or methacrylic acid is used based on 1 mole of triepoxypropyl isocyanurate.

In order to promote the reaction smoothly, one or more of $\alpha,\beta$-monoethylenically unsaturated compounds, such as methyl methacrylate, ethyl acrylate, butyl acrylate, 2-ethylhexyl acrylate, styrene and the like is used as a solvent. Since these polymerizable unsaturated compounds are used as the reaction solvent, about 50 to 5,000 p.p.m. of a polymerization inhibitor, such as hydroquinone, hydroquinone monomethyl ether, p-tert.-butylcatechol and the like are added.

The α,β-monoethylenically unsaturated compounds to be used as the reaction solvent remain as a component of the coated film after the curing with electron ray and therefore the α,β-monoethylenically unsaturated compounds influence upon the properties of the coated film. In order to provide weather resistance and toughness to the coated film, it is preferred to use methyl methacrylate. The solvents are used in such an amount that the solid content of the resin solution is 60 to 90% by weight in order to make the reaction smooth, considering the paintability and curability, and the optimum amount is 75%. The reaction of triepoxypropyl isocyanurate with acrylic acid or methacrylic acid is accelerated by adding a basic catalyst, such as tertiary amines or quaternary ammonium salts, so that the reaction time can be shortened by adding about 0.1 to 10% by weight of said catalyst, based on the reaction components, if necessary.

The basic catalysts include trimethylamine, tributylamine, dimethylaminoethyl methacrylate, diethylaminoethyl methacrylate, trimethylbenzylammonium chloride, triethylbenzylammonium chloride, and the like.

In the preparation of the component (I), triepoxypropyl isocyanurate, a given amount of solvent of α,β-monoethylenically unsaturated compound and a given amount of polymerization inhibitor are charged into a reaction vessel and the temperature is raised to 80° C. while stirring. Then a mixture of a given amount of acrylic acid or methacrylic acid, an esterifying catalyst and a polymerization inhibitor is added dropwise to the above described reaction vessel from a dropping funnel over 1 to 3 hours and during the addition, the temperature is maintained at 80° C. Then the reaction is continued at 90° C. for 4 to 10 hours and when the acid value of the resin solution becomes less than 15, the reaction system is cooled. The reaction mixture is filtered off to obtain substantially colourless viscous resin solution.

The above described resinous component (II) is prepared by reacting 1 mole of an amino group-containing compound with at least 2 moles of an aldehyde and then reacting with 2 to 6 moles of the above described α,β-unsaturated alcohol.

The amino group-containing compounds include dicyanediamide, urea, thiourea, ethylene urea, dihydroxyethylene urea, triazones, melamine, isomelamine, benzoguanamine, acetoguanamine, guanylmelamine, aniline, ammeline and the like. Particularly, urea, melamine, benzoguanamine and acetoquanamine are preferable.

The aldehydes include formaldehyde, acetaldehyde, propionaldehyde, butylaldehyde, acrolein, methacrolein, chrotone aldehyde and the like. But formaldehyde and the polymer thereof, that is, paraformaldehyde are most preferable.

The above described α,β-unsaturated esters are hydroxyalkyl esters of α,β-unsaturated acids, such as, β'-hydroxyethyl acrylate, β'-hydroxypropyl acrylate, β'-hydroxyethyl methacrylate and β'-hydroxypropyl methacrylate.

A part of the hydroxyalkyl esters of α,β-unsaturated acids which can form methylolated products of the above described amino group-containing compounds may be substituted with saturated alcohols in order to increase storage stability of the resinous component, to improve the compatibility with the other resins, to improve physical properties of the coated films formed by irradiation of electron ray, for example, impact resistance, adhesivity and processability and to control the chemical properties for example, reactivity. The saturated alcohols to be used for the purpose include normal butanol, isobutanol and methanol.

The preparation of the resinous component (II) will be explained with respect to an embodiment of reacting melamine with formaldehyde and β'-hydroxyethyl acrylate.

Melamine has the following structure:

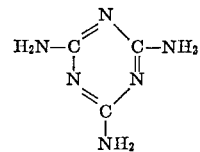

This amino group containing-compound has three amino groups having 6 active hydrogens and therefore at most 6 moles of methylol groups can be added. In this case, in order to add 6 moles of methylol group, more than 6 moles of formaldehyde are necessary. pH in the case of methylolating reaction is preferred to be weak alkaline of 8 to 10 and when pH is low, a methylene forming reaction is promoted and such pH affects adversely to the present invention.

1 mole of melamine and formalin containing 7.2 moles of formaldehyde are charged in a reaction vessel provided with a stirrer, a reflux condenser, a thermometer, a dropping funnel, an apparatus for removing water under a reduced pressure and a heating means and pH is made to be weak alkaline, thereafter the reaction mixture is heated to 70 to 80° C. Then white hazy liquid becomes transparent and then the temperature is raised to 85 to 90° C. while stirring and this condition is maintained for 15 minutes, after which 6 moles of β'-hydroxyethyl acrylate and 300 p.p.m. of hydroquinone are added by means of a dropping funnel. Immediately after the addition, the dehydration is effected under a reduced pressure by means of an apparatus for removing water under a reduced pressure and the reaction is progressed at 70 to 90° C. under a reduced pressure of lower than 70 mm. Hg and when the theoretical amount of water is removed, the reaction is completed. This reaction time is 3 to 12 hours. The properties of the aimed resin are adjusted by the mole number of the reaction components, pH, reaction temperature, reaction time, dehydrating process, amount of water removed and the like.

Namely, the numbers of functional group are adjusted by mole number of formaldehyde and β'-hydroxyethyl acrylate based on melamine and the reaction degree and viscosity are adjusted by pH, reaction temperature, reaction time and amount of water removed. In general, the increase of molecular weight through methylolation is influenced by pH and temperature and the rapid removal of the reaction water provides a resin having a low molecular weight and a high etherification degree. When the reaction is effected at a large amount of alcohol and at a low pH, a resin having a high etherification degree is produced.

As the other process, when hexamethoxymethyl melamine having the following structure:

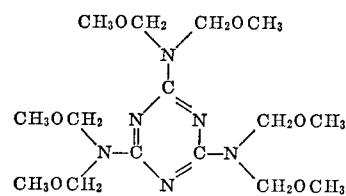

is reacted with β-hydroxyethyl acrylate under the same conditions as described above, the etherified product can be produced through the ether interchange process.

The resinous component (III) is prepared by reacting a drying oil or semi-drying oil with maleic anhydride and the above described α,β-unsaturated ester having the following general formula

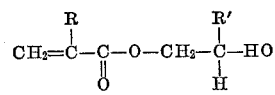

wherein R and R' are hydrogen or methyl group.

The natural drying oils or semi-drying oils include tung oil, linseed oil, safflower oil, soybean oil, rice bran oil, oiticica oil, cotton seed oil and particularly tung oil is most preferable in view of the excellent stability of the resinous component. The amount of maleic anhydride varies depending upon the oil selected but maleic anhydride is usually used within a range of 2 to 5 moles based on 1 mole of the oil. When the amount of maleic anhydride is less than 2 moles, the coated film is weak and is poor in the durability, while when the amount is more than 5 moles, the cured coated film is brittle and is poor in the water resistance and adhesivity.

The α,β-unsaturated esters are the same as described above and include β'-hydroxyethyl acrylate, β-hydroxypropyl acrylate, β'-hydroxyethyl methacrylate and β'-hydroxypropyl methacrylate. The amount of α,β-unsaturated ester is 2 to 5 moles based on 1 mole of the natural drying oil or semi-drying oil. The amount of α,β-unsaturated ester depends upon the mixing ratio with the component (I) or (II), but has a relation to the curability, mechanical properties, water resistance, chemical resistance, abrasion resistance and solvent resistance of the coated film and therefore, the proper amount is determined by the use object.

When the amount of the α,β-unsaturated ester is less than 2 moles based on 1 mole of the drying or semi-drying oil, the cured coated film is generally weak and poor in the durability, while when the amount is more than 5 moles, the cured coated film is brittle and is poor in the adhesivity to a substrate.

For the preparation of the resinous component (III), the natural drying or semi-drying oil and maleic anhydride are charged in a reaction vessel at a given ratio and heated while stirring to raise the temperature to 180 to 230° C. and the reaction is continued for 1 to 5 hours. Then the pressure in the reaction system is reduced and the unreacted maleic anhydride is removed. The step for removing maleic anhydride under a reduced pressure is not always necessary and when the water resistance and chemical resistance are not required, this step may be omitted. This resulting product is cooled to 80 to 150° C. and then added with about 50 to 5,000 p.p.m. of a polymerization inhibitor, such as hydroquinone, hydroquinone-monomethyl ether, p-tert.butylcatechol and the like and further added with a given amount of the α,β-unsaturated ester and the reaction is effected at 80 to 150° C. for 1 to 16 hours.

This reaction is accelerated by adding a basic catalyst, such as tertiary amines or quaternary ammonium salts, for example, triethylamine, tributylamine, dimethylaminoethyl methacrylate, diethylaminoethyl methacrylate, trimethylbenzylammonium chloride, triethylbenzylammonium chloride and the like. If necessary, by adding about 0.1 to 10% by weight based on the reaction components, of said catalyst, the reaction time can be shortened.

As mentioned above, the paint composition of the present invention consists essentially of a mixture of the component (I) or (II) with the resinous component (III). As the ratio of the components (I) or (II) increases, the curability increases, even if the amount of electron rays irradiated is same and the cured coated film is hard and is excellent in the abrasion resistance, stain resistance and chemical resistance, while as the ratio of the resinous component (III) increases, the flexibility of the cured coated film is improved.

According to the present invention the mixing ratio of the component (I) or (II) to the resinous component (III) is 90:10 to 10:90 (weight percent). Because, when the ratio of the component (I) or (II) is more than 90% by weight, the ratio exceeds the optimum compounding amount and therefore, the physical properties of the cured coated film, for example, impact resistance, adhesivity, processability, hardness and the like are deteriorated. Particularly, when the mixing ratio of the component (I) or (II) is 20 to 30% by weight, the cured coated film is very good in the mechanical properties, salt water resistance, moisture resistance and chemical resistance and such paint composition is most preferable for painting of metals. When the mixing ratio of the component (I) or (II) is 35 to 50% by weight, the cured coated film is particularly excellent in abrasion resistance, stain resistance and weather resistance and such a paint composition is most preferable for paint for floor and when the irradiation of electron ray is effected in air, the stickiness does not remain in the surface of the coated film and the surface is smooth and a polishing step is not necessary. The paint compositions of the present invention can be applied on surfaces of wood, metal, glass, synthetic resin, construction materials or machine parts and provide the excellent cured coated film having a high durability.

The resinous product of the present invention composed of a mixture of the component (I) or (II) and the resinous component (III) is added with 0.01 to 10% by weight of a saturated aliphatic hydrocarbon having a melting point of higher than 30° C. or wax having a melting point of higher than 30° C. or a mixture of both the said substances, and the resulting mixture is applicable to painting and provides excellent cured coated film having a gloss and no surface stickiness. Because, the resinous component (III) in the paint composition can disperse the saturated aliphatic hydrocarbon or wax thoroughly and provide a smooth and glossy coated film and further provide a satisfactory curability at a low amount of electron ray and a coated film having no surface stickiness.

Into the paint composition of the present invention may be dispersed pigment, dyestuff, finely divided aluminum and the like to be generally used in the field of paint and the resulting product can be used as a coloured composition.

The following examples are given in illustration of this invention and are not intended as limitations thereof.

EXAMPLE 1

A component (I) was prepared as follows: Into a reaction vessel equipped with a dropping funnel, a stirrer, a reflux condenser and a thermometer were charged 444 parts of triepoxypropyl isocyanurate, 214 parts of methyl methacrylate and 0.2 part of hydroquinone, and the resulting mixture was heated and kept at 80° C. while stirring. Then, a mixture of 308 parts of acrylic acid, 34 parts of dimethylaminoethyl methacrylate and 0.1 part of hydroquinone, which had previously been charged in a dropping funnel, was added dropwise into the reaction vessel in 2 hours, during which the temperature of the reaction system was kept at 80° C. After completion of the addition, when the reaction was continued at 90° C. for 6 hours, the acid value of resinous material became 12. The resinous material was cooled gradually and then filtered to obtain the component (I), which was a substantially colourless and viscous substance.

A resinous component (III) was prepared as follows: Into a reaction vessel equipped with a stirrer, a reflux condenser and a thermometer were charged 900 parts of tung oil and 343 parts of maleic anhydride, and the resulting mixture was heated gradually. The reaction began at 60 to 70° C., and heat was generated to raise the temperature to 180° C. The reaction was continued at 180° C. for 1 hour and then at 200° C. for 2 hours, after which the reaction mixture was gradually cooled to 100° C. and then reacted with 22 parts of dimethylaminoethyl methacrylate, 406 parts of β'-hydroxyethyl acrylate and 0.2 part of hydroquinone at 90 to 95° C. for 4 hours. The reaction mixture was further added with 0.2 part of hydroquinone and then diluted with 508 parts of methyl methacrylate to obtain the resinous component (III), which was a dark red viscous substance.

350 parts of the above obtained component (I), 650 parts of the above obtained resinous component (III), 0.5 part of beeswax and 0.2 part of a saturated aliphatic hydrocarbon having a melting point of 40° C. were mixed, and the resulting mixture was heated at 50° C. to disperse and dissolve the beeswax and saturated aliphatic hydrocarbon. The resulting paint composition was applied on a flooring material (birch board) or a lauan veneer board, on which an electron ray was irradiated in an absorbed dose of 5 megarads at 300 kv. and 25 ma. in the air to obtain a smooth coated film which did not stick at the surface.

The properties of the coated film were as follows.

| | |
|---|---|
| Cross-hatch test: (After 1 mm. x 1 mm. cut, coated film is peeled off by means of cellophane tape.) | Excellent. |
| Abrasion resistance: (Taber abrasion testing machine, load: 1,000 g. total number of revolutions: 800). | Abrasion loss is apparently smaller than that in the case of conventional unsaturated polyester resin, and the abrasion resistance is excellent. |
| Boiling water resistance (dipped for 3 hours). | More excellent than conventional unsaturated polyester resin. |
| Ethyl acetate resistance: (Sanitary cotton impregnated with ethyl acetate is placed on a test piece and covered with a watch glass for 2 hours). | Do. |
| Alkali resistance: (dipped in 1% aqueous solution of sodium carbonate for 2 hours). | Excellent. |
| Acid resistance: (dipped in 5% aqueous solution of acetic acid for 2 hours). | Do. |
| Stain resistance: (lines of rapidly drying blue ink are drawn on a coated film, and 4 hours after, the lines are wiped with alcohol). | Do. |

EXAMPLE 2

A mixture of 800 parts of the resinous component (III) prepared in Example 1, 0.5 part of beeswax and 0.2 part of a saturated aliphatic hydrocarbon having a melting point of 40° C. was kneaded together with 200 parts of red iron oxide by means of a roll mill, and further mixed with 200 parts of the component (I) prepared in Example 1 and 100 parts of methyl methacrylate to obtain a paint composition. The resulting paint composition was applied on a bonderited steel (zinc phosphate type) having a thickness of 0.8 mm., on which an electron ray was irradiated in an absorbed dose of 6 megarads at 300 kv. and 25 ma. in air to obtain a smooth coated film which did not stick at the surface.

The properties of the coated film were as follows.

| | |
|---|---|
| Hardness: (lead pencil, Mitsubishi Uni trademark, made by Mitsubishi Empitsu K.K.). | 2H. |
| Impact resistance: (Du Pont impact tester, diameter: ½ inch, weight: ½ kg., height: 50 cm.). | Good. |
| 180° bending resistance: (diameter: 1 mm.) | Excellent. |
| Cross-hatch test: (after 1 mm x 1 mm. cut, coated film is peeled off by means of cellophane tape). | Do. |
| Boiling water resistance: (dipped for 3 hours) | Do. |
| Salt water resistance: (dipped in 3% aqueous solution of sodium chloride for 300 hours). | Particularly excellent. |
| Moisture resistance: (left to stand in a room at 100% RH and at 50° C. for 300 hours). | Do. |

EXAMPLE 3

A resinous component (III) was prepared as follows: Into the same reaction vessel as used in Example 1 were charged 900 parts of tung oil and 245 parts of maleic anhydride, and the resulting mixture was heated on a water bath. When the temperature reached 60 to 70° C., heat was generated to raise the temperature to 150° C. The reaction mixture was allowed to cool to 120° C. and kept at this temperature for 1 hour. Then the mixture was reacted with 5 parts of hydroquinone and 325 parts of β'-hydroxypropyl acrylate at 120° C. for 4 hours. The reaction mixture was further added with 0.2 part of hydroquinone and then diluted with 470 parts of methyl methacrylate to obtain the resinous component (III) which was a light brown viscous substance.

200 parts of the component (I) prepared in Example 1, 800 parts of the above obtained resinous component (III), 0.5 part of beeswax and 0.2 part of a saturated aliphatic hydrocarbon having a melting point of 40° C. were mixed, and the resulting mixture was heated to 50° C. to disperse and dissolve the beeswax and saturated aliphatic hydrocarbon. The resulting paint composition was applied on a galvanized sheet steel having a thickness of 0.3 mm., on which an electron ray was irradiated in an absorbed dose of 6 megarads at 300 kv. and 25 ma. in air to obtain a smooth coated film which did not stick at the surface.

The properties of the coated film were as follows.

| | |
|---|---|
| Hardness: (lead pencil, Mitsubishi Uni) | H. |
| Impact resistance: (Du Pont impact tester, diameter: ½ inch, weight: ½ kg., height: 50 cm.). | Good. |
| Impact resistance from rear side: (Du Pont impact tester, diameter: ½ inch, weight: ½ kg., height: 40 cm.). | Do. |
| 180° bending resistance: (diameter: 1 mm.) | Excellent. |
| Cross-hatch test: (after 1 mm. x mm. cut, coated film is peeled off by means of cellophane tape). | Do. |
| Boiling water resistance: (dipped in boiling water for 3 hours). | Do. |
| Salt water resistance: (dipped in 3% aqueous solution of sodium chloride for 300 hours). | Particularly excellent. |
| Moisture resistance: (left to stand in a room at 100% RH and at 50° C. for 300 hours). | Do. |

EXAMPLE 4

A component (I) was prepared as follows: Into the same reaction vessel as used in Example 1 were charged 444 parts of triepoxypropyl isocyanurate, 260 parts of ethyl acrylate and 0.2 part of hydroquinone, and the resulting mixture was heated gradually to 80° C. and kept at this temperature while stirring. A mixture of 368 parts of methacrylic acid, 8 parts of triethylbenzylammonium chloride and 0.1 part of hydroquinone, which had previously been charged in a dropping funnel, was added dropwise into the reaction vessel in 3 hours, during which the temperature of the reaction system was kept at 80° C. After completion of the addition, when the reaction was continued at 90° C. for 5 hours, the acid value of resinous material became 13. The resinous material was cooled gradually and filtered to obtain the component (I), which was a light yellow viscous substance.

A resinous component (III) was prepared as follows: Into the same reaction vessel as used in Example 1 were charged 900 parts of tung oil and 490 parts of maleic anhydride, and the resulting mixture was heated gradually while stirring. When the temperature reached 60 to 70° C., heat was generated violently to raise the temperature to 180° C. The reaction mixture was kept at 180° C. for 1 hour and then kept at 230° C. for 4 hours to complete the reaction. Then, the pressure in the reaction vessel was reduced to 100 to 150 mm. Hg to remove unreacted maleic anhydride. The reaction mixture was cooled gradually to 100° C. and then reacted with 14 parts of triethylamine, 650 parts of β'-hydroxyethyl methacrylate and 0.3 part of hydroquinone at 95 to 105° C. for 5 hours. The reaction mixture was further added with 0.1 part of hydroquinone and diluted with 660 parts of methyl methacrylate to obtain the resinous component (III).

A mixture of 550 parts of the above obtained resinous component (III), 0.5 part of beeswax and 0.2 part of a saturated aliphatic hydrocarbon having a melting point of 40° C. was kneaded together with 300 parts of rutile titanium white by means of a roll mill, and further mixed with 450 parts of the above obtained component (I) and 100 parts of methyl methacrylate. The resulting white resinous material was further diluted with methyl methacrylate so that the viscosity was 30 seconds by means of a Ford cup No. 4. The resulting paint composition was applied on a hard board by means of a roller coater, on which an electron ray was irradiated in an absorbed dose of 3 megarads at 300 kv. and 25 ma. in air to obtain a cured coated film having a smooth and glossy surface.

The properties of the coated film were as follows.

| | |
|---|---|
| Hardness: (lead pencil, Mitsubishi Uni) | 3H. |
| Cross-hatch test: (after 1 mm. x 1 mm. cut, coated film is peeled off by means of cellophane tape). | Excellent. |
| Abrasion resistance: (Taber abrasion testing machine, load: 1,000 g., total number of revolutions: 800). | Particularly excellent. |
| Boiling water resistance: (dipped for 3 hours) | Excellent. |
| Ethyl acetate resistance: (2 hours) | Particularly excellent. |
| Alkali resistance: (1% aqueous solution of sodium carbonate, 2 hours). | Do. |
| Acid resistance: (5% aqueous solution of acetic acid, 2 hours). | Do. |
| Stain resistance: (rapidly drying blue ink, 4 hours) | Do. |
| Weather resistance: (weather-ometer, 500 hours) | Excellent. |

EXAMPLE 5

A resinous component (III) was prepared as follows: Into the same reaction vessel as used in Example 1 were charged 900 parts of linseed oil and 196 parts of maleic anhydride, and the resulting mixture was reacted at 180° C. for 1 hour and further at 230° C. for 3 hours while introducing gaseous nitrogen. The reaction mixture was cooled gradually to 100° C., added with 11 parts of triethylamine, 232 parts of β-hydroxyethyl acrylate and 0.2 part of hydroquinone, and then kept at 90 to 95° C. for 6 hours. Then, the resulting reaction mixture was further added with 0.2 part of hydroquinone and diluted with 420 parts of methyl methacrylate to obtain the resinous component (III).

500 parts of the component (I) prepared in Example 4, 500 parts of the above obtained resinous component (III), 0.5 part of beeswax and 0.2 part of a saturated aliphatic hydrocarbon having a melting point of 40° C. were mixed, and the resulting mixture was heated to 50° C. to disperse and dissolve the beeswax and saturated aliphatic hydrocarbon. The resulting paint composition was applied on an aluminum plate having a thickness of 1 mm., on which an electron ray was irradiated in an absorbed dose of 4 megarads at 300 kv. and 30 ma. to obtain a glossy and smooth cured coated film, which did not stick at the surface.

The thus obtained cured coated film had the hardness (lead pencil) of 3 H and was excellent in all of the ethyl acetate, xylene, alkali, acid, moisture and weather resistances.

EXAMPLE 6

A component (I) was prepared as follows: Into the same reaction vessel as used in Example 1 were charged 498 parts of triepoxypropyl isocyanurate, 250 parts of methyl methacrylate and 0.2 part of hydroquinone, and the resulting mixture was gradually heated to 80° C. and kept at this temperature. Then, a mixture of 242 parts of acrylic acid, 10 parts of dimethylaminoethyl methacrylate and 0.1 part of hydroquinone, which had previously been charged in a dropping funnel, was added dropwise into the reaction vessel in 3 hours, during which the temperature of the reaction system was kept at 80° C. After completion of the addition, when the reaction was continued at 90° C. for 3 hours, the acid value of a resinous material lowered less than 10. The resinous material was cooled gradually and then filtered to obtain the component (I), which was a light yellow viscous substance.

A resinous component (III) was prepared as follows: Into the same reaction vessel as used in Example 1 were charged 900 parts of safflower oil and 196 parts of maleic anhydride, and the resulting mixture was gradually heated while stirring. When the temperature reached 60 to 70° C., heat was generated violently to raise the temperature to 180° C. The reaction mixture was kept at 180° C. for 1 hour and then at 230° C. for 4 hours to complete the reaction. The pressure in the reaction vessel was reduced to 100 to 150 mm. Hg to remove unreacted maleic anhydride. The reaction mixture was gradually cooled to 100° C. and then reacted with 11 parts of triethylamine, 260 parts of β-hydroxypropyl acrylate and 0.6 part of hydroquinone at 95 to 105° C. for 5 hours. The resulting reaction mixture was further added 0.3 part of hydroquinone and diluted with 453 parts of methyl methacrylate to obtain the resinous component (III).

500 parts of the above obtained resinous component (III), 0.5 part of beeswax, 0.2 part of saturated aliphatic hydrocarbon having a melting point of 40° C. and 500 parts of the above obtained component (I) were mixed thoroughly to obtain a paint composition. The resulting paint composition was applied on a galvanized sheet steel having a thickness of 0.8 mm., on which an electron ray was irradiated in an absorbed dose of 6 megarads at 300 kv. and 25 ma. in air to obtain a cured coated film.

The properties of the cured coated film were as follows.

| | |
|---|---|
| Hardness: (lead pencil, Mitsubishi Uni) | H. |
| Impact resistance: (Du Pont impact tester, diameter: ½ inch, weight: ½ kg, height: 50 cm.). | Good. |
| Impact resistance from rear side: (Du Pont impact tester, diameter: ½ inch, weight: ¼ kg., height: 40 cm.). | Do. |
| 180° bending resistance: (diameter: 1 mm.) | Excellent. |
| Cross-hatch test: (after 1 mm. x 1 mm. cut, coated film is peeled off by means of cellophane tape). | Do. |
| Boiling water resistance: (dipped for 3 hours) | Do. |
| Moisture resistance: (left to stand in a room at 100% RH and at 50° C. for 300 hours). | Do. |

EXAMPLE 7

A resinous component (III) was prepared as follows: Into the same reaction vessel as used in Example 1 were charged 900 parts of safflower oil and 196 parts of maleic anhydride, and the resulting mixture was gradually heated. The reaction began at 60 to 70° C. and heat was generated to raise the temperature to 180° C. The reaction was continued at 180° C. for 1 hour and then at 200° C. for 2 hours. The reaction mixture was gradually cooled to 100° C., then added with 22 parts of dimethylaminoethyl methacrylate, 288 parts of β-hydroxypropyl methacrylate and 0.6 part of hydroquinone, and kept at 90 to 95° C. for 4 hours. The resulting reaction mixture was further added with 0.3 part of hydroquinone and then diluted with 461 parts of methyl methacrylate to obtain the resinous component (III).

500 parts of the above obtained resinous component (III), 500 parts of the component (I) prepared in Example 6, 0.5 part of beeswax and 0.2 part of a saturated aliphatic hydrocarbon having a melting point of 40° C. were mixed, and the resulting mixture was heated to 50° C. to disperse and dissolved the beeswax and saturated aliphatic hydrocarbon. The resulting paint composition was applied on a flooring material (birch board) or a lauan board, on which an electron ray was irradiated in an absorbed dose of 6 megarads at 300 kv. and 25 ma. in air to obtain a cured coated film.

The properties of the cured coated film were as follows.

| | |
|---|---|
| Cross-hatch test: (after 1 mm. x 1 mm. cut, coated film is peeled off by means of cellophane tape). | Excellent. |
| Abrasion resistance: (Taber abrasion testing machine, load: 1,000 g. total number of revolutions: 800). | Abrasion loss is apparently smaller than that in the case of conventional unsaturated polyester resin, and the abrasion resistance is excellent. |
| Boiling water resistance: (dipped for 3 hours). | More excellent than conventional unsaturated polyester resin. |
| Ethyl acetate resistance: (2 hours). | Do. |
| Alkali resistance: (1% aqueous solution of sodium carbonate, 2 hours). | Excellent. |
| Ethanol resistance: (Sanitary cotton impregnated with ethanol is placed on a test piece and covered with a watch glass for 2 hours). | Do. |

EXAMPLE 8

A resinous component (II) was prepared as follows: Into a reaction vessel equipped with a stirrer, a reflux condenser, a thermometer, a dropping funnel, a vacuum dehydrating means and a heating means were charged 126 parts of melamine and 682 parts of formalin and then a small amount of a 10% aqueous solution of sodium carbonate was added thereto, while stirring, to adjust pH to 8.0. The amount of the aqueous solution of sodium carbonate added was 0.08%. Next, the temperature was raised to 60° C. to 70° C., during which the reaction solution gradually became clear and was substantially clear at about 70° C. The temperature was further raised to 85 to 90° C., at which the solution was maintained for 15 minutes to reach the equilibrium state.

Then, a mixture of 697 parts of β'-hydroxyethyl acrylate and 0.5 part of hydroquinone as a polymerization inhibitor was gradually added to the said solution through the dropping funnel at such a dropping rate that the reaction temperature was maintained within the range of 85 to 90° C.

Immediately after the completion of the addition of β'-hydroxyethyl acrylate, the vacuum dehydrating means was actuated to effect dehydration. The dehydrating operation was carried out at 45 to 90° C. under a pressure of 40 to 7 mm. Hg for 5.5 hours to obtain the colorless and transparent resinous component (II) having a viscosity of 780 centipoises (at 25° C.) in a yield of 90%.

A resinous component (III) was prepared as follows: Into a reaction vessel equipped with a stirrer, a reflux condenser and a thermometer were charged 900 parts of tung oil and 343 parts of maleic anhydride and the resulting mixture was heated gradually. The reaction began at 60 to 70° C., and heat was generated somewhat violently to raise the temperature to 180° C. The reaction was continued at 180° C. for 1 hour and at 200° C. for 2 hours, whereafter the resulting reaction mixture was gradually cooled to 100° C. and then 22 parts of dimethylaminoethyl methacrylate, 406 parts of β'-hydroxyethyl acrylate and 0.2 part of hydroquinone were added thereto and the resulting mixture was maintained at 90 to 95° C. for 4 hours. Thereafter, the reaction mixture was further added with 0.2 part of hydroquinone and then diluted with 508 parts of methyl methacrylate. The thus obtained resinous component (III) was a dark red and viscous substance.

900 parts of the above obtained resinous component (II), 100 parts of the above obtained resinous component (III), 0.5 part of beeswax and 0.2 part of a saturated aliphatic hydrocarbon having a melting point of 40° C. were mixed and heated to 50° C. to disperse and dissolve the beeswax and the saturated aliphatic hydrocarbon, and then the resulting paint composition was applied on a sizing material, on which an electron ray was irradiated in an absorbed dose of 6 megarads at 300 kv. and 25 ma. in air to obtain a smooth coated film which did not stick at the surface.

EXAMPLE 9

A mixture of 900 parts of the resinous component (III) obtained in Example 8, 0.5 part of beeswax and 0.2 part of a saturated aliphatic hydrocarbon having a melting point of 40° C. was kneaded together with 200 parts of red iron oxide in a roll mill and further mixed with a mixture of 100 parts of the resinous component (II) obtained in Example 8 and 100 parts of methyl methacrylate to obtain a paint composition. This paint composition was applied on a bonderited steel (zinc phosphate type) of 0.8 mm. thickness, on which an electron ray was irradiated in an absorbed dose of 6 megarads at 300 kv. and 25 ma. in air to obtain a smooth coated film which did not stick at the surface.

EXAMPLE 10

A resinous component (III) was prepared as follows: Into the same reaction vessel as used in Example 8 were charged 900 parts of tung oil and 245 parts of maleic anhydride and the resulting mixture was heated on a water bath. When the temperature reached 60° C. to 70° C., heat was generated to raise the temperature to 150° C. The reaction mixture was gradually cooled to 120° C. and maintained at this temperature for 1 hour, whereafter 5 parts of hydroquinone was dissolved therein and further 325 parts of β'-hydroxypropyl acrylate was added thereto and then the resulting mixture was reacted at 120° C. for 4 hours. Thereafter, the reaction mixture was added with 0.2 part of hydroquinone and diluted with 470 parts of methyl methacrylate. The thus obtained resinous component (III) was a light yellow and viscous substance.

200 parts of resinous component (II) obtained in Example 8, 800 parts of the above obtained resinous component (III), 0.5 part of beeswax and 0.2 part of a saturated aliphatic hydrocarbon having a melting point of 40° C. were mixed and heated to 50° C. to disperse and dissolve the beeswax and the saturated aliphatic hydrocarbon, and the resulting paint composition was applied on a galvanized sheet steel of 0.3 mm. thickness, on which an electron ray was irradiated in an adsorbed dose of 6 megarads at 300 kv. and 25 ma. in air to obtain a smooth coated film which did not stick at the surface.

EXAMPLE 11

A resinous component (II) was prepared as follows: Into the same reaction vessel as used in Example 8 were charged 126 parts of melamine and 682 parts of formalin, and a small amount of a 10% aqueous solution of sodium carbonate was added thereto, while stirring, to adjust pH to 8.0. The amount of the aqueous solution of sodium carbonate added was 0.08%. Next, the temperature was raised to 60 to 70° C., during which the white hazy melamine was gradually dissolved and the reaction solution became clear and was completely clear at about 70° C. The temperature was further raised to 85 to 90° C., at which the solution was maintained for 15 minutes to reach the equilibrium state.

Then, a mixture of 781 parts of β'-hydroxyethyl methacrylate and 0.5 part of hydroquinone as a polymerization inhibitor was gradually added to said solution through the dropping funnel at such a dropping rate that the reaction temperature was maintained within the range of 85 to 90° C. Immediately after the completion of the addition of β'-hydroxyethyl methacrylate, the vacuum dehydrating means was actuated to effect dehydration. The dehydrating operation was carried out at 45 to 90° C. under a pressure of 40 to 7 mm. Hg for 6 hours to obtain the light yellow resinous component (II) having a viscosity of 4,200 centipoises (at 25° C.) in a yield of 87%.

A resinous component (III) was prepared as follows: Into the same reaction vessel as used in Example 8 were charged 900 parts of tung oil and 490 parts of maleic anhydride and the resulting mixture was gradually heated while stirring. When the temperature reached to 60 to 70° C., heat was generated violently to raise the temperature to 180° C. The reaction mixture was maintained at this temperature for 1 hour and heated to 230° C., at which the reaction was carried out for 4 hours, whereafter the reaction system was reduced to 100 to 150 mm. Hg to remove unreacted maleic anhydride. The reaction mixture was gradually cooled to 100° C. and added with 14 parts of triethylamine, 650 parts of β'-hydroxyethyl methacrylate and 0.3 part of hydroquinone and the resulting mixture was reacted at 95° C. to 105° C. for 5 hours. Thereafter, the reaction mixture was further added with 0.1 part of hydroquinone and diluted with 660 parts of methyl methacrylate to obtain the resinous component (III).

A mixture of 550 parts of the above obtained resinous component (III), 0.5 part of beeswax and 0.2 part of a saturated aliphatic hydrocarbon having a melting point of 40° C. was kneaded together with 300 parts of rutile titanium white in a roll mill and further mixed with 450 parts of the above obtained resinous component (II) and 100 parts of methyl methacrylate. The thus obtained white paint composition was further diluted with methyl methacrylate so that the viscosity was 30 seconds by means of a Ford cup No. 4 and then applied on a hard board with a roller coater, on which an electron ray was irradiated in an absorbed dose of 5 megarads at 300 kv. and 25 ma. in air to obtain a cured coated film. The surface of the coated film was smooth and glossy.

EXAMPLE 12

A resinous component (III) was prepared as follows: Into the same reaction vessel as used in Example 8 were charged 900 parts of linseed oil and 196 parts of maleic anhydride and the resulting mixture was reacted at 180° C., for 1 hour and then at 230° C. for 3 hours while introducing gaseous nitrogen. After gradually cooled to 100° C., 11 parts of triethylamine, 232 parts of B'-hydroxyethyl acrylate and 0.2 part of hydroquinone were added and the resulting mixture was maintained at 90 to 95° C. for 6 hours. Thereafter, the reaction mixture was further added with 0.2 part of hydroquinone and diluted with 420 parts of methyl methacrylate to obtain the resinous component (III).

500 parts of the resinous component (II) obtained in Example 11, 500 parts of the above obtained resinous component (III), 0.5 part of beeswax and 0.2 part of a saturated aliphatic hydrocarbon having a melting point of 40° C. were mixed and heated to 50° C. to disperse and dissolve the beewax and the saturated aliphatic hydrocarbon, and the resulting paint composition was applied on an aluminum plate of 1 mm. thickness, on which an electron ray was irradiated in an absorbed dose of 4 megarads at 300 kv. and 30 ma. in air to obtain a glossy and smooth cured coated film which did not stick at the surface.

EXAMPLE 13

A resinous component (II) was prepared as follows: Into the same reaction mixture vessel as used in Example 8 were charged 126 parts of melamine and 628 parts of formalin, and a small amount of a 10% aqueous solution of sodium carbonate was added thereto, while stirring, to adjust pH to 8.0. The amount of the aqueous solution of sodium carbonate added was 0.08%. Next, the temperature was raised to 60 to 70° C. to completely dissolve melamine and further the temperature was raised and maintained at 85 to 90° C. for 15 minutes.

Then, a mixture of 348 parts of β'-hydroxyethyl acrylate, 311 parts of n-butanol and 0.4 part of hydroquinone was gradually added through the dropping funnel in such a dropping rate that the reaction temperature was maintained within the range of 85 to 90° C. Immediately after the completion of the addition of β'-hydroxyethyl acrylate, the vacuum dehydrating means was actuated to effect dehydration. The dehydrating operation was carried out at 40 to 90° C. under a pressure of 70 to 7 mm. Hg for 7 hours to remove 485 parts of water-butanol mixture, whereby the resinous component (II) was obtained.

A resinous component (III) was prepared as follows: Into the same reaction vessel as used in Example 8 were charged 900 parts of safflower oil and 196 parts of maleic anhydride, and the resulting mixture was gradually heated while stirring. When the temperature reached 60 to 70° C., heat was generated to raise the temperature to 180° C. The reaction mixture was maintained at this temperature for 1 hour and then at 230° C. for 4 hours to complete the reaction. Thereafter, the reaction system was reduced to 100 to 150 mm. Hg to remove unreacted maleic anhydride. After gradually cooled to 100° C., 11 parts of triethylamine, 260 parts of β'-hydroxypropyl acrylate and 0.6 part of hydroquinone were added and the resulting mixture was reacted at 95 to 105° C. for 5 hours. Thereafter, the reaction mixture was further added with 0.3 part of hydroquinone and diluted with 453 parts of methyl methacrylate to obtain the resinous component (III).

500 parts of the above obtained component (III), a mixture of 0.5 part of beeswax and 0.2 part of a saturated aliphatic hydrocarbon having a melting point of 40° C., and 500 parts of the above obtained resinous component (II) were mixed thoroughly, and the resulting paint composition was applied on a galvanized sheet steel of 0.8 mm. thickness, on which an electron ray was irradiated in an absorbed dose of 6 megarads at 300 kv. and 25 ma. in air to obtain a hard and glossy coated film.

EXAMPLE 14

A resinous component (III) was prepared as follows: Into the same reaction vessel as used in Example 8 were charged 900 parts of safflower oil and 196 parts of maleic anhydride, and the resulting mixture was heated gradually. The reaction began at 60 to 70° C., and heat was generated to raise the temperature to 180° C. The reaction was continued at this temperature for 1 hour and then at 200° C. for 2 hours. After gradually cooled to 100° C., 22 parts of dimethylaminoethyl methacrylate, 288 parts of β'-hydroxypropyl methacrylate and 0.6 part of hydroquinone were added thereto and the resulting mixture was maintained at 90 to 95° C. for 4 hours. Thereafter, the resulting mixture was further added with 0.3 part of hydroquinone and diluted with 461 parts of methyl methacrylate to obtain the resinous component (III).

500 parts of the above obtained resinous component (III), 500 parts of the resinous component (II) obtained in Example 13, 0.5 part of beeswax and 0.2 part of a saturated aliphatic hydrocarbon having a melting point of 40° C. were mixed, and the resulting mixture was heated to 50° C. to disperse and dissolve the beeswax and the saturated aliphatic hydrocarbon, and the resulting paint composition was applied on a flooring material (birch board) or a lauan board, on which an electron ray was irradiated in an absorbed dose of 6 megarads at 300 kv. and 25 ma. in air to obtain a glossy and smooth coated film having no stickiness.

EXAMPLE 15

A resinous component (II) was prepared as follows: Into the same reaction vessel as used in Example 8 were charged 60 parts of urea, 182 parts of paraformaldehyde and 60 parts of water and the resulting mixture was heated to 60 to 70° C., while stirring, to make a uniform phase and then pH was adjusted to 8.0 with the addition of a 10% aqueous solution of sodium carbonate. Then, the temperature was raised to 85 to 90° C., at which the solution was maintained for 30 minutes and then a mixture of 464 parts of β'-hydroxyethyl acrylate and 0.2 part of hydroquinone was added thereto at a time. As the result of this addition, the temperature lowered to 40° C. Next, the vacuum dehydration was started at this temperature and the temperature was gradually raised to 90° C. to obtain the resinous component (II).

500 parts of the above obtained resinous component (II), 500 parts of the resinous component (III) obtained in Example 11, 0.5 part of beeswax and 0.2 part of a saturated aliphatic hydrocarbon having a melting point of 40° C. were mixed to obtain a paint composition. A thin sheet of wood of 1 mm. thickness was immersed in the paint composition and impregnated sufficiently with the paint composition. Then, an electron ray was irradiated on the sheet in an absorbed dose of 10 megarads at 1,000 kv. and 3 ma. to cure the composition.

EXAMPLE 16

A resinous component (II) was prepared as follows: Into the same reaction vessel as used in Example 8 were charged 187 parts of benzoguanamine and 389 parts of formalin, and a small amount of a 10% aqeuous solution of sodium carbonate was added thereto, while stirring, to adjust pH to 8.0.

Then, the temperature was raised to 85 to 90° C., at which the resulting solution was maintained for 45 minutes. Subsequently, a small amount of acrylic acid was added dropwise to the reaction solution to make the solution weak-acidic. 464 parts of $\beta'$-hydroxyethyl acrylate and 0.3 part of hydroquinone were thoroughly mixed and the resulting mixture was added dropwise to the weak-acidic reaction solution within a short time. Immediately after the completion of the addition, a vacuum dehydration was effected to remove 250 parts of water to obtain the resinous component (II).

500 parts of the above obtained resinuous component (II), 500 parts of the resinous component (III) obtained in Example 11, 0.5 part of beeswax and 0.2 part of a saturated aliphatic hydrocarbon having a melting point of 40° C. were mixed, and the resulting paint composition was applied on a sizing material, on which an electron ray was irradiated in an absorbed dose of 6 megarads at 300 kv. and 25 ma. to obtain a cured coated film.

EXAMPLE 17

A resinous component (II) was prepared as follows: Into the same reaction vessel as used in Example 8 were charged 125 parts of acetoguanamine and 389 parts of formalin, and then a 10% aqueous solution of sodium carbonate was added thereto, while stirring, to adjust pH to 8.0.

Then, the temperature was raised to 85 to 90° C., at which the reaction solution was maintained for 30 minutes. Subsequently, a small amount of acrylic acid was added dropwise to the reaction solution to make the solution weak-acidic. 464 parts of $\beta'$-hydroxyethyl acrylate and 0.3 part of hydroquinone were thoroughly mixed and the resulting mixture was added dropwise to the weak-acidic reaction solution within a short time. Immediately after the completion of the addition, a vacuum dehydration was effected to remove 250 parts of water to obtain the resinous component (II).

500 parts of the above obtained resinous component (II), 500 parts of the resinous component (III) obtained in Example 11, 0.5 part of beeswax and 0.2 part of a saturated aliphatic hydrocarbon having a melting point of 40° C. were mixed and the resulting paint composition was applied on a sizing material, on which an electron ray was irradiated in an absorbed dose of 6 megarads at 300 kv. and 25 ma. to cure the coated film.

EXAMPLE 18

A resinuous component (II) was prepared as follows: Into the same reaction vessel as used in Example 8 were charged 126 parts of melamine and 584 parts of formalin, and a small amount of a 10% aqueous solution of sodium carbonate was added thereto, while stirring, to adjust pH to 8.0. Then, the temperature was raised to 60 to 70° C., during which the white hazy melamine was gradually dissolved and the reaction solution became clear and was completely clear at about 70° C. In this case, if formalin was colored to yellow, the reaction solution was also yellow. The temperature was further raised to 85 to 90° C., at which the solution was kept for 30 minutes to reach the equilibrium state.

Then, a mixture of 390 parts of $\beta'$-hydroxypropyl acrylate, 222 parts of isobutanol and 0.4 part of hydroquinone as a polymerization inhibitor was added to said solution through the dropping funnel in a comparatively short period. By this addition, the temperature was lowered to about 50° C., but the vacuum dehydrating means was actuated at this temperature to effect the dehydration. The dehydrating operation was carried out under a pressure of 40 to 7 mm. Hg. The completion of reaction was a time when 370 parts of water was removed. The thus obtained resinuous component (II) was light yellow and transparent.

500 parts of the above obtained resinuous component (II), 500 parts of the resinuous component (III) obtained in Example 11, 0.5 part of beeswax and 0.2 part of a saturated aliphatic hydrocarbon having a melting point of 40° C. were mixed thoroughly, and the resulting paint composition was applied on a galvanized sheet steel of 0.8 mm., thickness, on which an electron ray was irradiated in an absorbed dose of 6 megarads at 300 kv. and 25 ma. in air to obtain a coated film.

The obtained coated film was glossy and did not stick at the surface.

EXAMPLE 19

A resinous component (II) was prepared as follows: Into the same reaction vessel as used in Example 8 were charged 126 parts of melamine and 584 parts of formalin, and a small amount of a 10% aqueous solution of sodium carbonate was added thereto, while stirring, to adjust pH to 8.0. Then, the temperature was raised to 60 to 70° C. to completely dissolve melamine, and further raised to 85 to 90° C., at which the reaction solution was maintained for 30 minutes and then a mixture of 433 parts of $\beta'$-hydroxypropyl methacrylate, 96 parts of methanol and 0.4 part of hydroquinone as a polymerization inhibitor was added to said solution through the dropping funnel in a comparatively short period.

After the reaction was carried out by the addition of the mixture of $\beta'$-hydroxypropyl methacrylate, methanol and hydroquinone at a temperature of 85 to 90° C. for 1 hour, 370 parts of water was removed by means of the vacuum dehydrating means under a pressure of 40 to 7 mm. Hg for 5 hours. The thus obtained resinous component (II) was a colourless and transparent substance having a low viscosity.

500 parts of the above obtained resinous component (II), 500 parts of the resinous component (III) obtained in Example 11, 0.5 part of beeswax and 0.2 part of a saturated aliphatic hydrocarbon having a melting point of 40° C. were mixed thoroughly, and the resulting paint composition was applied on a galvanized sheet steel of 0.8 mm. thickness, on which an electron ray was irradiated in an absorbed dose of 6 megarads at 300 kv. and 25 ma. in air to obtain a cured coated film.

The coated film thus obtained was glossy and did not stick at the surface.

What is claimed is:

1. A paint composition capable of being cured by irradiation of electron ray in a low absorbed dose, which comprises a component (I) obtained by reacting triepoxypropyl isocyanurate with a sufficient amount of acrylic acid or methacrylic acid to esterify two or more epoxy groups in said isocyanurate or a component (II) obtained by reacting (A) a reaction product of 1 mole of urea, melamine, benzoguanamine or acetoguanamine with at least 2 moles of formaldehyde, or (B) hexamethoxymelamine with 2 to 6 moles of an α,β-unsaturated ester having the general formula

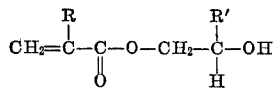

wherein R and R' are hydrogen or methyl group alone or in admixture with a saturated alcohol, and a resinous component (III) obtained by reacting a reaction product of 1 mole of a natural drying oil or semi-drying oil with 2 to 5 moles of maleic anhydride with 2 to 5 moles of the above described α,β-unsaturated ester based on 1 mole of the drying oil or semi-drying oil, a mixing ratio of said component (I) or (II) to said resinous component (III) being 90:10 to 10:90 (by weight).

2. The paint-composition as claimed in claim 1, wherein said α,β'-unsaturated ester is β'-hydroxyethyl acrylate, β'-hydroxypropyl acrylate, β'-hydroxyethyl methacrylate, or β'-hydroxypropyl methacrylate.

3. The paint composition as claimed in claim 1 wherein said saturated alcohol is n-butanol, isobutanol or methanol.

4. The paint composition as claimed in claim 1 wherein said drying oil is tung oil or linseed oil.

5. The paint composition as claimed in claim 1, wherein said semi-drying oil is safflower oil.

References Cited

UNITED STATES PATENTS

| | | | |
|---|---|---|---|
| 3,288,736 | 11/1966 | Wright et al. | 260—23 |
| 3,527,721 | 9/1970 | Honel et al. | 260—21 |
| 3,404,110 | 10/1968 | Hunt | 260—23 |
| 3,551,235 | 12/1970 | Bassemir et al. | 260—23 |

DONALD E. CZAJA, Primary Examiner

R. W. GRIFFIN, Assistant Examiner

U.S. Cl. X.R.

117—161 LN, 161 UC; 204—159.14; 260—18 EP, 18 TN, 23 AR